Patented Mar. 26, 1940

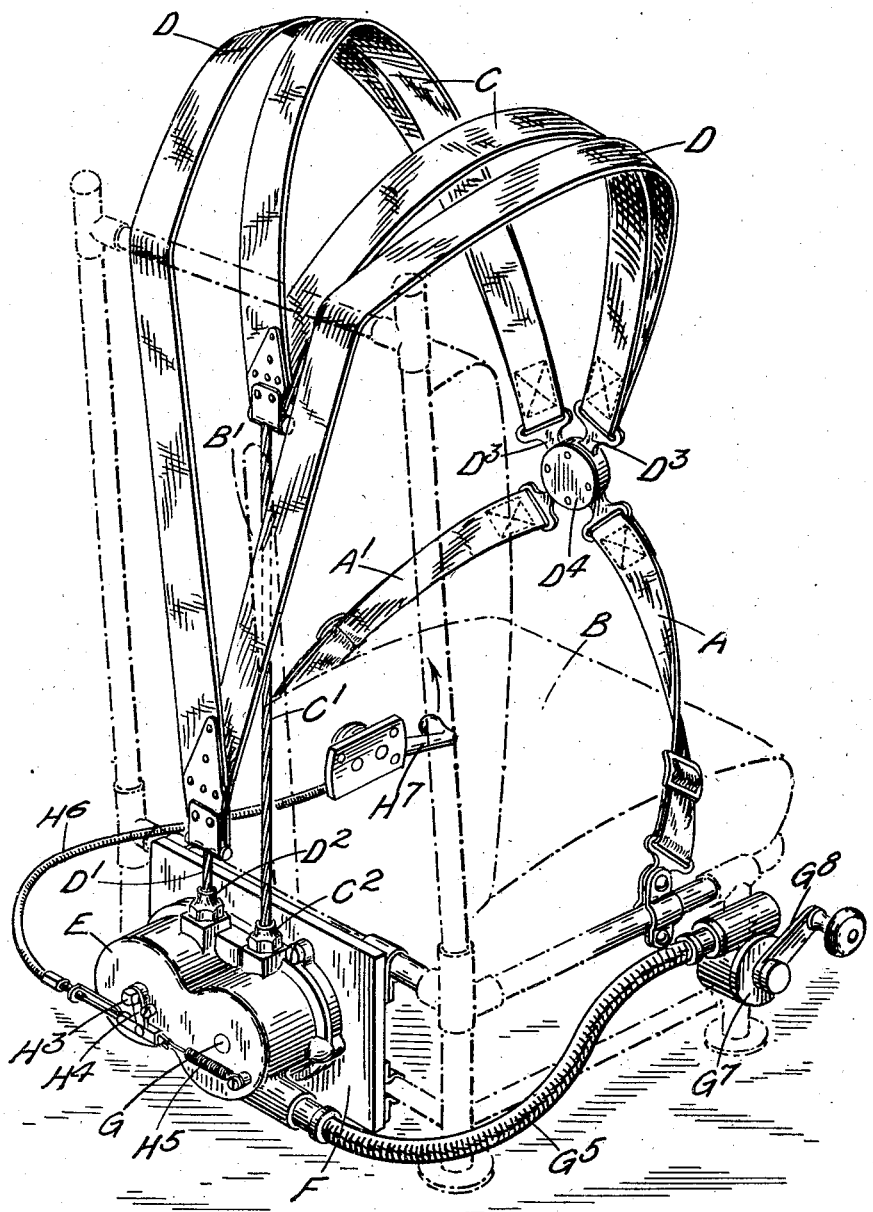

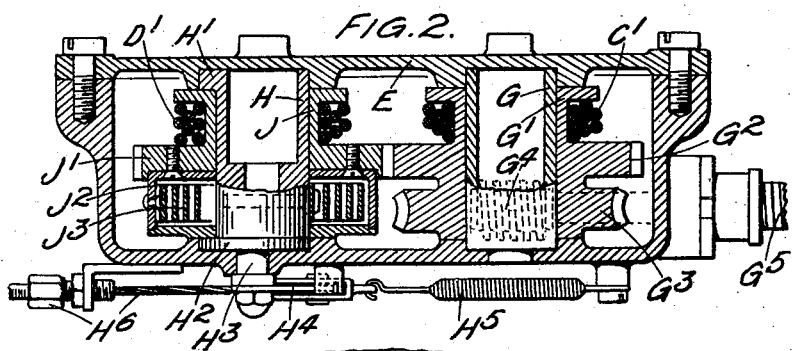
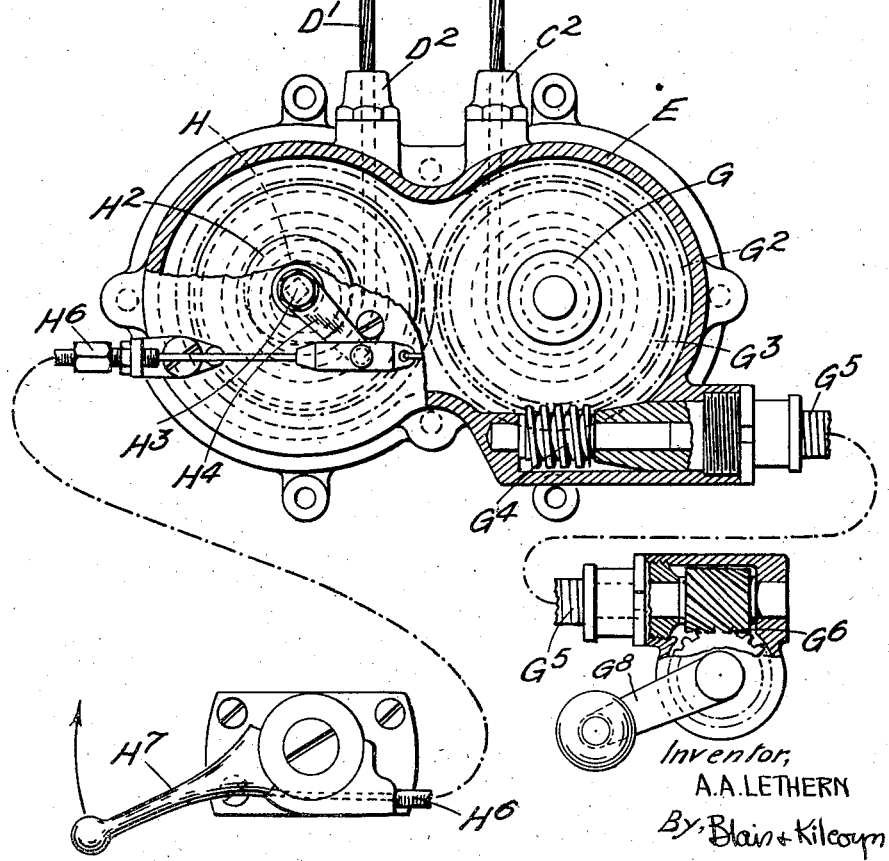

2,195,334

UNITED STATES PATENT OFFICE

2,195,334

SAFETY APPARATUS FOR RETAINING PERSONS IN THE SEATS OF AIRCRAFT OR OTHER VEHICLES

Albert Alexander Lethern, London, England, assignor to The Mills Equipment Company Limited, London, England, a company of Great Britain Application December 6, 1939, Serial No. 307,931
In Great Britain June 21, 1938

15 Claims. (Cl. 244—122)

This invention relates to safety apparatus for retaining in their seats persons in aeroplanes or other vehicles, for example land vehicles or boats, and of the kind comprising harness including lower straps (hereinafter called side straps) secured at their lower ends to the sides of a seat and adapted to be connected in front of the person to the front ends of two pairs of shoulder straps adapted to pass over the person's shoulders to the back of the seat where they are anchored, the side straps and shoulder straps being connected together by a common fastening which is usually of the quick release type, enabling the ends of the straps to be released instantaneously from one another to free the person from the harness when desired. This fastening will hereinafter for the sake of convenience be referred to as the quick release fastening.

By a pair of shoulder straps is to be understood two straps which are adapted to pass respectively over the two shoulders of the person.

The object of the invention is to provide improved apparatus of the kind in question which while enabling the harness to be adjusted readily in accordance with requirements will also permit the necessary shoulder straps to be slackened off to a certain degree when desired so as to permit the person to lean forward when necessary.

To this end according to the present invention in apparatus of the above kind the means for anchoring the rear ends of the shoulder straps to the back of the seat comprises two winding drums, conveniently supported in a casing or frame, and each drum connected by a flexible tension member to the rear ends of one pair of shoulder straps, manually operated adjusting mechanism for rotating the drums simultaneously, a clutch or the equivalent (hereinafter called a clutch) whereby one drum can be disconnected from the adjusting mechanism so as to be capable of rotating independently thereof and of the other drum and manually controlled clutch engaging and disengaging mechanism. Preferably the clutch or the equivalent acts to connect the drums to and disconnect them from one another and the adjusting mechanism directly rotates one of the drums and acts to rotate the other through it when the clutch is engaged.

For the sake of convenience the drum which is directly rotated by or always coupled to the adjusting mechanism will be referred to as the directly operated drum while the other drum which can be connected to or disconnected from the adjusting mechanism by the clutch will be referred to as the indirectly operated drum.

In safety apparatus of the kind referred to one pair of shoulder straps pass down the person's back to hold him down in the seat while the other pair of straps pass over the back of the seat to hold him from inadvertently falling forward.

It is intended that the directly operated drum be connected by its flexible tension member to the two shoulder straps which hold the person down and the indirectly operated drum be connected by its flexible tension member to the two shoulder straps which normally hold the person's shoulders back against the back of the seat so that the disengagement of the clutch permits the person to lean forward while still being held down on the seat.

Conveniently the rear ends of each pair of shoulder straps are connected to one another while the front ends of the two shoulder straps which pass over each shoulder are connected together.

Preferably the indirectly operated drum is provided with a spring always tending to rotate it in a direction to tighten the pair of shoulder straps to which it is connected. Thus when the clutch is disengaged the person can lean forward, this movement unwinding the tension member from the indirectly operated drum against the action of the spring and if with the clutch still disengaged the person then resumes his normal position in the seat the spring will automatically again wind in the tension member connected to the indirectly operated drum whereupon on re-engagement of the clutch it will lock this drum to the directly operated drum.

The mechanism for imparting rotation to the directly operated drum should preferably be of the self locking type, for example a worm and worm wheel so that while the drum can be rotated at will in either direction by the manual adjusting mechanism any force exerted by the tension members on the drums will be unable to cause movement of the drums.

In a preferred arrangement the two drums are mounted on parallel axes and the clutch comprises pinions formed on or connected respectively to the two drums and capable of being brought into and out of engagement by the clutch engaging and disengaging mechanism. Thus while the directly operated drum conveniently rotates on a fixed axis the indirectly operated drum is mounted on a member or spindle which is supported in bearings parallel to the axis of the drum but eccentric with respect to such axis so that by rocking the said spindle in these supporting bearings the axes of the gear wheels can be moved towards or away from one another so as to cause engagement or disengagement of the gear wheels. In such an arrangement the spring tending to rotate the indirectly operated drum conveniently extends between this drum and the spindle on which it is mounted and is arranged so that it tends to rock the spindle always in the direction to bring the gear wheels into engagement.

The invention may be carried into practice in various ways but one construction according to the invention is illustrated in the accompanying drawings, in which:

Figure 1 is a perspective view of the apparatus showing its general layout with respect to the seat.

Figure 2 is a sectional plan of the mechanism controlling the tension members, the section being taken approximately through the axes of the drums.

Figure 3 is an elevation partly in section of the mechanism controlling the tension members.

In the construction illustrated the harness comprises two side straps $A$, $A^1$, which are preferably adjustable in length, secured to the sides of the seat indicated at $B$, and two pairs $C$ and $D$ of shoulder straps adapted to pass over the person's shoulders, the two straps constituting each pair being connected together at their rear ends as shown. The two straps which pass over the same shoulder are connected together at their forward ends and these forward ends and the upper ends of the side straps carry plates $D^3$ which cooperate with a quick release device $D^4$ whereby the plates can be connected together or instantaneously released from one another when desired.

The pair of shoulder straps $C$ are connected at their rear ends to a tension member $C^1$ in the form of a flexible wire which in the arrangement shown is disposed so as to pass down the person's back and through a slot $B^1$ in the back of the seat. The pair of shoulder straps $D$ are arranged to pass over a bar or roller fitted to the top of the seat, then down the back of the seat and finally are connected at their rear ends to a similar tension member $D^1$.

The control apparatus for the tension members $C^1$ and $D^1$ comprises a casing $E$ secured to a suitable support $F$ at the rear of the seat and containing two parallel spindles $G$ and $H$. The spindle $G$ is fixed within the casing and carries a rotatable drum $G^1$ to which the tension member $C^1$ is secured and around which it is adapted to be wound. This drum is formed integral with a gear wheel $G^2$ and with a worm wheel $G^3$ meshing with a worm $G^4$ supported in bearings in the casing and arranged to be rotated through a flexible transmission device $G^5$ and skew gearing $G^6$ in a gear case $G^7$ adapted to be secured to one side of the seat and arranged to be manually operated by a handle $G^8$.

The other spindle $H$ is provided at its ends with eccentric portions $H^1$, $H^2$ by which it is rotatably supported in the casing $E$ and carries a rotatable drum $J$ connected to the tension member $D^1$ so that the latter can be wound thereon. Formed integral with the drum $J$ is a gear wheel $J^1$ lying in the same plane as the gear wheel $G^2$ the arrangement being such that by rocking the spindle $G$ of the gear wheel $J^1$ can at will be brought into or out of mesh with the gear wheel $G^2$. Secured to the gear wheel $J^1$ is a casing $J^2$ within which is a spiral spring $J^3$ the outer end of which is connected to the casing $J^2$ while its inner end is connected to the spindle $H$ in such a manner that this spring always tends to rotate the gear wheel $J^1$ in a direction to wind in the tension member $D^1$ and to rock the spindle $H$ in a direction to bring the two gear wheels $J^1$, $G^2$ into engagement.

The spindle $H$ is provided with an extension $H^3$ which extends through the outer face of the casing $E$ and carries an arm $H^4$ acted upon by a tension spring $H^5$ also tending to rock the spindle $H$ always into the position to maintain engagement between the gear wheels $J^1$ and $G^2$. The arm $H^4$ is also connected to flexible control mechanism $H^6$ of the Bowden wire type controlled by a control lever $H^7$ adapted to be secured to the side of the seat whereby the spindle $H$ can be rocked when desired to cause engagement or disengagement of the gear wheels $J^1$, $G^2$.

Guides $C^2$, $D^2$ are provided for the tension members $C^1$ and $D^1$ to guide them correctly on to the drums $G^1$ and $J$.

It will be seen that when the harness has been fastened around a person he can by actuating the lever $H^7$ to disengage the gear wheels $J^1$, $G^2$ adjust initially the relative effective lengths of the two pairs of shoulder straps $C$ and $D$. With the gear wheels $J^1$, $G^2$ in engagement he can also tighten or loosen these two pairs of straps simultaneously by operation of the handle $G^8$. Thus the harness can readily be adjusted to suit requirements and when adjusted correctly it is locked in such position of adjustment owing to the self-locking action of the worm and worm wheel.

If now the person wishes to lean forward he can by means of the lever $H^7$ disengage the gear wheels $J^1$, $G^2$ so as to permit the tension member $D^1$ to unwind from the drum $J$ under a light pull on the shoulder straps $D$. If desired by then causing reengagement of the gear wheels $J^1$, $G^2$ the shoulder straps $D$ can be maintained in their slack condition. On the other hand by maintaining the gear wheels $J^1$, $G^2$ disengaged or again disengaging them the tension member $D^1$ can be caused to be automatically rewound upon its drum $J$ under the action of the spring $J^3$ when the person again assumes the normal position in the seat and the drum $J$ can then be relocked by re-engaging the gear wheels $J^1$, $G^2$.

In a modified arrangement employing similar safety harness and control apparatus to that shown in the drawings the tension member $C^1$ instead of passing through a vertical slot in the back of the seat may pass down the inside of the back of the seat to a point adjacent to the base of the seat and then under a horizontal roller or the like and through the back of the seat to the control apparatus, a second horizontal roller preferably being provided over which the tension member passes, serving to guide it vertically through the guide $C^2$. In this way the ability of the person to lean forward freely when the gear wheels are disengaged may be facilitated.

Again the worm $G^4$ may be arranged above instead of below the worm wheel $G^3$ or even in some cases vertically at the side of this worm wheel, while other modifications may be made within the scope of the appended claims without departing from this invention.

What I claim as my invention and desire to secure by Letters Patent is:

1. In safety apparatus for aeroplane users of the kind comprising a seat and harness including shoulder straps secured at their rear ends to the back of the seat, the combination with the seat of two winding drums, a flexible tension member connecting each drum to the rear end of a pair of shoulder straps, means for driving both drums simultaneously, and means whereby one drum can be disconnected from said driving means and rotated independently thereof.

2. In safety apparatus for aeroplane users of the kind comprising a seat and harness including shoulder straps secured at their rear ends to the back of the seat, the combination with the seat of two winding drums, a flexible tension member connecting each drum to the rear end of a pair of shoulder straps, manually operated means for rotating the drums simultaneously, clutch mechanism whereby one drum can be disconnected from the driving mechanism so as to rotate independently thereof and of the other drum, and manually controlled means for operating the clutch mechanism.

3. Safety apparatus for aeroplane users as claimed in claim 1, including parallel axes on which the two drums are mounted, said clutch mechanism comprising pinions connected to the drums and means by which they can be brought into and out of engagement with one another.

4. In safety apparatus for aeroplane users of the kind comprising a seat and harness including shoulder straps secured at their rear ends to the back of the seat, the combination with the seat of two winding drums, a flexible tension member connecting each drum with the rear end of a pair of shoulder straps, a fixed axis about which one of the drums rotates, a spindle for the second drum arranged parallel to the axis of the first drum but eccentric with respect to its own drum, clutch mechanism comprising pinions mounted on each drum, actuating mechanism for the clutch adapted to rock the spindle so as to move the axes of the pinions towards or away from one another, and manually controlled mechanism for rotating the drums.

5. Safety apparatus for aeroplane users as claimed in claim 4 including a spring associated with said indirectly operated drum tending always to rotate said drum in a direction to wind in the tension member secured thereto.

6. Safety apparatus for aeroplane users as claimed in claim 4 including a spring associated with said indirectly driven drum tending always to rotate said drum in a direction to wind in the tension member secured thereto and to rock the supporting spindle of said drum in a direction to bring the two drums into engagement with one another.

7. Safety apparatus for aeroplane users as claimed in claim 1 in which the driving means is self-locking so that forces applied to the drum by the tension members cannot bring about the movement of the driving mechanism whilst permitting this mechanism always to impart the desired movement to the drums.

8. Safety apparatus for aeroplane users as claimed in claim 1 including worm and worm wheel type driving means.

9. Safety apparatus for aeroplane users as claimed in claim 1 including a flexible power transmission device associated with said driving means.

10. Safety apparatus for aeroplane users as claimed in claim 2 in which the clutch actuating mechanism includes a flexible power transmission device one end of which is connected to the clutch actuating member and a hand actuating lever secured to the other end.

11. Anchoring and adjusting mechanism for use with safety apparatus of the kind referred to comprising two winding drums, a flexible tension member connecting each drum to the rear end of one pair of shoulder straps, manually operated adjusting mechanism for rotating the drums simultaneously, clutch mechanism whereby one drum can be disconnected from said adjusting mechanism so as to be free to rotate independently thereof and of the other drum, and manually controlled means for operating the clutch mechanism.

12. Anchoring and adjusting mechanism as claimed in claim 11 for use with safety apparatus of the kind referred to in which the two drums are mounted on parallel axes and the clutch comprises pinions carried by the two drums and capable of being brought into and out of engagement with one another by the clutch actuating mechanism.

13. Anchoring and adjusting mechanism as claimed in claim 11, including a fixed axis about which the directly operated drum rotates and a spindle parallel to the axis of the first drum but eccentric with respect to the axis of its own drum upon which the indirectly operated drum is mounted, pinions connected to each drum and constituting clutch members when brought into engagement with one another, and mechanism for operating said spindle so as to move the axes of the pinions carried by the drums towards or away from one another when the drums are to be moved into or out of engagement.

14. Anchoring and adjusting mechanism as claimed in claim 11, including a spring associated with said indirectly operated drum tending always to rotate said drum in a direction to wind in the tension member secured thereto.

15. Anchoring and adjusting mechanism as claimed in claim 11 for use with safety apparatus of the kind referred to in which the adjusting mechanism is of the self-locking type.

ALBERT ALEXANDER LETHERN.